UNITED STATES PATENT OFFICE.

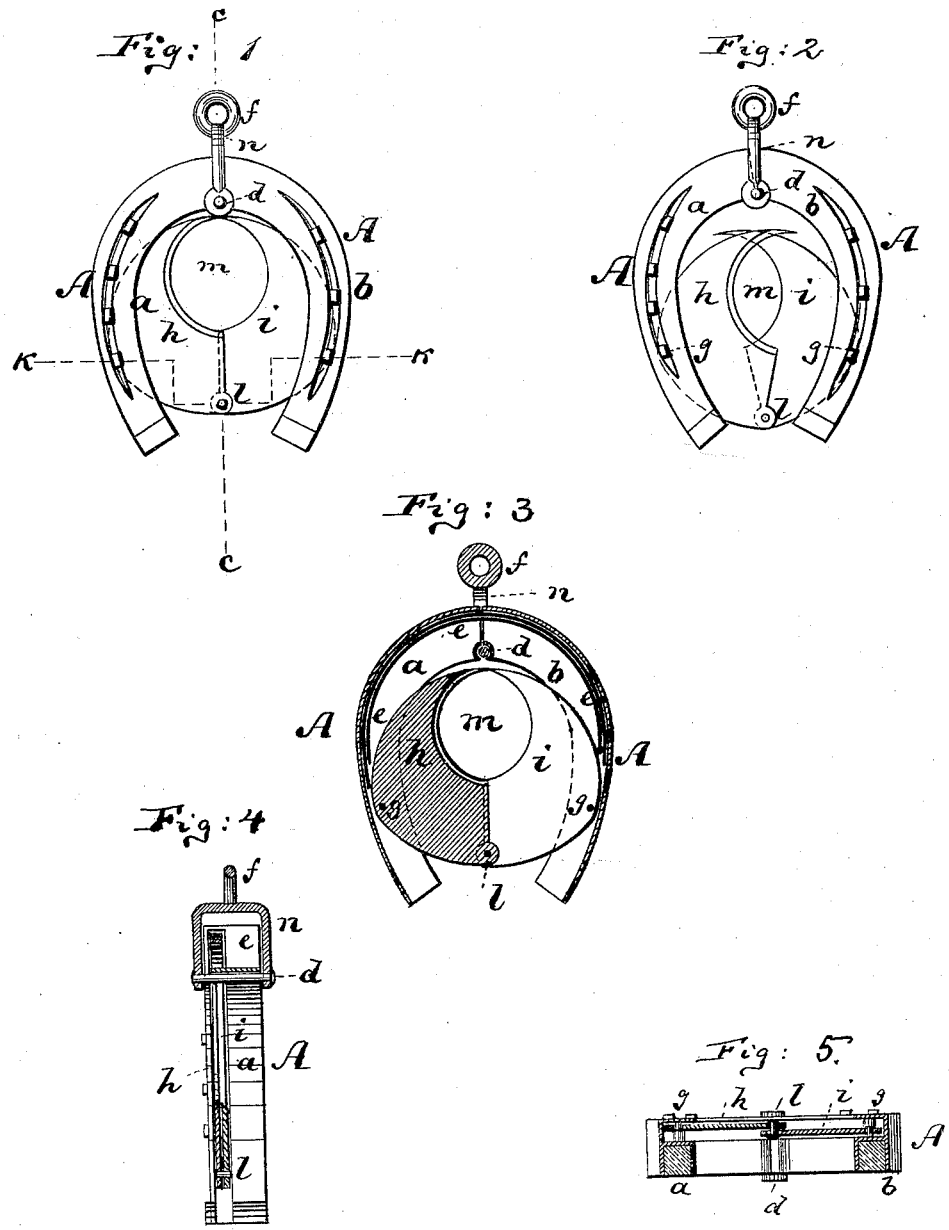

JOSEPH WIENHOLD, OF STAPLETON, NEW YORK.

CIGAR-CUTTER.

SPECIFICATION forming part of Letters Patent No. 232,864, dated October 5, 1880.

Application filed April 29, 1880. (No model.)

*To all whom it may concern:*

Be it known that I, JOSEPH WIENHOLD, of Stapleton, in the county of Richmond and State of New York, have invented a new and Improved Cigar-Cutter, of which the following is a specification.

Figure 1 is a face view of my improved cigar-cutter, showing it entirely open. Fig. 2 is a face view thereof, showing it partly contracted. Fig. 3 is a central section thereof parallel to the face. Fig. 4 is a vertical cross-section on line $c\ c$, and Fig. 5 a horizontal inverted cross-section on line $k\ k$ of Fig. 1.

This invention relates to a new portable instrument for cutting the ends of cigars preparatory to smoking.

It consists of a pair of shear-blades pivoted together and to an outer jointed handle-frame, and provided with an opening spring, all as hereinafter more fully described.

The instrument can be made in form of a horseshoe and of a size sufficiently small to be suspended from watch-chains, so that it will be conveniently reached by the smoker.

In the drawings, the letter A represents the outer frame of the cigar-cutter, said frame being composed of two wings or handles, $a$ and $b$, which are united by a pivot, $d$, and on which pivot they can be vibrated. A concealed inner spring, $e$, holds the parts $a\ b$ apart, as in Figs. 1 and 2, so that their upper ends meet.

The pivot-pin $d$ is preferably united to a hasp, $n$, which has an eye or a hook, $f$, for suspending the device from a watch-chain or other object.

The frame A is shown horseshoe-shaped, each wing being hollow to receive the spring $e$ and the pivots $g\ g$ of the shear-blades $h$ and $i$; but it may be made of other suitable form.

By the pins $g\ g$ the two blades $h$ and $i$ are respectively pivoted to the parts $a$ and $b$ of the frame A. These two blades are also directly united by a pivot, $l$, as shown. By pressing the two wings $a\ b$ together with the fingers the pivots $g\ g$ are made to approach, and the blades $h\ i$ thereby made to pass by each other to cut off the tip or point of a cigar placed between them. When the outside pressure ceases the spring $e$ at once swings the wings $a\ b$ apart and restores all the parts to their normal position, as clearly shown in Figs. 1 and 2. It will be seen that in said normal position a circular opening, $m$, is formed between the cutters $h\ i$ of a size to receive the point of a cigar.

The drawings are on an enlarged scale, to more clearly show the different parts of the mechanism.

I claim—

1. The combination of the frame A, consisting of the jointed parts $a\ b$, with the blades $h$ and $i$, pivots $g$ and $l$, and spring $e$, substantially as herein shown and described.

2. The combination of the suspension-hasp $n$ and pin $d$ with the jointed frame A and with the pivoted blades $h$ and $i$, for operation substantially as herein shown and described.

JOSEPH WIENHOLD.

Witnesses:
 WILLY G. E. SCHULTZ,
 WILLIAM H. C. SMITH.